(12) United States Patent
Sarvestani

(10) Patent No.: US 12,484,762 B2
(45) Date of Patent: Dec. 2, 2025

(54) ENDOSCOPIC NAVIGATION POINTER

(71) Applicant: B. Braun New Ventures GmbH, Freiburg Im Breisgau (DE)

(72) Inventor: Amir Sarvestani, Freiburg (DE)

(73) Assignee: B. Braun New Ventures GmbH, Freiburg im Breisgau (DE)

( * ) Notice: Subject to any disclaimer, the term of this patent is extended or adjusted under 35 U.S.C. 154(b) by 49 days.

(21) Appl. No.: 18/529,240

(22) Filed: Dec. 5, 2023

(65) Prior Publication Data

US 2024/0099560 A1 Mar. 28, 2024

Related U.S. Application Data

(63) Continuation of application No. PCT/EP2022/064645, filed on May 30, 2022.

(30) Foreign Application Priority Data

Jun. 7, 2021 (DE) ..................... 10 2021 114 586.4

(51) Int. Cl.
*A61B 5/00* (2006.01)
*A61B 1/00* (2006.01)
*A61B 34/20* (2016.01)

(52) U.S. Cl.
CPC .......... *A61B 1/0008* (2013.01); *A61B 1/0005* (2013.01); *A61B 1/00181* (2013.01);
(Continued)

(58) Field of Classification Search
CPC . A61B 1/0008; A61B 1/0005; A61B 1/00181; A61B 2034/2051; A61B 2034/2057
See application file for complete search history.

(56) References Cited

U.S. PATENT DOCUMENTS 6,863,650 B1 3/2005 Irion
7,079,883 B2 7/2006 Marino et al.
(Continued)

FOREIGN PATENT DOCUMENTS

DE 19731894 C1 5/1999
DE 69927717 T2 7/2006
(Continued)

OTHER PUBLICATIONS

Search Report received in German Application No. 10 2021 114 586.4 dated Feb. 25, 2022, with translation, 17 pages.
(Continued)

*Primary Examiner* — Joel F Brutus
(74) *Attorney, Agent, or Firm* — Christopher A. Rothe; CM Law

(57) ABSTRACT

A medical instrument can be used with a surgical assistance system, display method and storage medium. The instrument includes a handling portion, an end portion, a tip for examining tissue, and a shaft interconnecting the handling portion and the end portion. The handling portion includes a reference system having a predefined position relative to the tip, so that a position and/or orientation of the tip can be determined. A distal portion of the shaft and/or the end portion has a capture unit having a sensor for creating an intracorporeal capture in a capture direction and a lamp for illuminating the intracorporeal capture. The intracorporeal capture can be computer readable. The capture unit can have a capture position and/or orientation with respect to the reference system and/or the tip. The medical instrument has an interface adapted to transmit data to transmit the intracorporeal capture to a control unit.

23 Claims, 3 Drawing Sheets

(52) U.S. Cl.
CPC ...... *A61B 34/20* (2016.02); *A61B 2034/2051* (2016.02); *A61B 2034/2057* (2016.02); *A61B 2034/2068* (2016.02)

(56) References Cited

U.S. PATENT DOCUMENTS

| | | |
|---|---|---|
| 7,824,328 B2 | 11/2010 | Gattani et al. |
| 9,345,441 B2 | 5/2016 | Wendler |
| 10,582,856 B2 | 3/2020 | Hauger et al. |
| 2005/0078175 A1* | 4/2005 | Kaneko ............ A61B 3/0041 348/65 |
| 2005/0197536 A1* | 9/2005 | Banik .............. A61B 1/0016 600/179 |
| 2015/0045675 A1 | 2/2015 | Chernomorsky |
| 2015/0223725 A1* | 8/2015 | Engel ............. A61B 34/20 600/417 |
| 2016/0249986 A1* | 9/2016 | Krüger ............ A61B 34/20 606/130 |
| 2017/0209389 A1* | 7/2017 | Toth .............. A61N 1/0456 |
| 2017/0238790 A1 | 8/2017 | Gilboa |
| 2019/0328217 A1* | 10/2019 | Moreau ........... A61B 1/00091 |
| 2020/0014851 A1* | 1/2020 | Wang .............. G06F 3/011 |
| 2020/0034969 A1* | 1/2020 | Isaacs ............. A61B 90/96 |
| 2020/0375666 A1 | 12/2020 | Murphy et al. |

FOREIGN PATENT DOCUMENTS

| | | |
|---|---|---|
| DE | 102011121708 A1 | 6/2013 |
| DE | 102014103044 A1 | 9/2015 |
| EP | 2020900 B1 | 6/2012 |
| WO | 2005104939 A2 | 11/2005 |
| WO | 2014203604 A1 | 12/2014 |

OTHER PUBLICATIONS

Search Report received in International Application No. PCT/EP2022/064645 dated Sep. 20, 2022, with translation, 10 pages.
Written Opinion received in International Application No. PCT/EP2022/064645 dated Sep. 20, 2022, with translation, 15 pages.

* cited by examiner

ENDOSCOPIC NAVIGATION POINTER

CROSS-REFERENCE TO RELATED APPLICATIONS

This application is a continuation of International Application No. PCT/EP2022/064645, filed on May 30, 2022, and claims priority to German Application No. 10 2021 114 586.4, filed on Jun. 7, 2021. The contents of International Application No. PCT/EP2022/064645 and German Application No. 10 2021 114 586.4 are incorporated by reference herein in their entireties.

FIELD

The present disclosure relates to a medical, in particular surgical, instrument comprising: a proximal handling portion, in particular a handle; a distal end portion adapted to be inserted intracorporeally into a patient and having a distal tip adapted to sample/palpate an intracorporeal tissue of a patient without damaging it, in particular being blunt; and a shaft connecting the proximal handling portion to the distal end portion, preferably rigidly. In particular, the distal tip is rigidly/immovably fixed/connected to the handling portion. The handling portion has a geometric reference system which has a predetermined pose, i.e. position and orientation, relative to the distal (sampling) tip, so that a position and/or orientation of the distal tip in three-dimensional space is (indirectly) detectable and determinable via the geometric reference system. In addition, the present disclosure relates to a surgical assistance system, a surgical (image) representation method and a computer-readable storage medium.

BACKGROUND

In many surgical procedures, such as neurosurgery or spinal surgery, endoscopic visualization or representation and navigation are essential, operation-critical technologies. Both technological modalities, namely visualization on the one hand and navigation on the other, enable the surgeon to target tissue and to identify and manipulate it safely and precisely. This is particularly important in minimally invasive procedures where the surgeon's direct view is severely restricted.

However, these two modalities have a tiring effect on a surgeon, since the surgeon has to alternate between endoscopy and navigation. In particular, the surgeon has to alternate between two different instruments in the form of a so-called pointer with a blunt tip for navigation and a bulky, heavy and large endoscope for the desired visualization. With the pointer or navigation pointer, the position or pose of the distal tip of the pointer is shown in 3D image data on a display assigned to navigation, so that the surgeon can use the tip to determine exactly where the distal tip is currently located in the patient. The surgeon has to look at this display, which is often configured to be mobile for customized positioning in the operating room. The intracorporeal image of the endoscope is displayed on a different surgical monitor. Consequently, the surgeon and medical professionals have to constantly look back and forth between these two display devices.

Endoscopy, on the one hand, makes it possible to target and approach tissue by means of an intracorporeal view/vision, while navigation, on the other hand, makes it possible to approach/move to tissue with reference to 3D image data, in particular a preoperative image such as magnetic resonance imaging (MRI) or computed tomography (CT). Particularly in endoscopically assisted neurosurgery, where the two technologies of navigation and visualization are used very frequently, the surgeon has to constantly swap or switch between the corresponding instruments, i.e. the endoscope and the navigation pointer/navigation indicator.

Although navigated, flexible endoscopes are also known in which navigation trackers/elements are attached to a distal end portion of the endoscope and are tracked, for example, with an infrared tracking camera (NDI) or an electromagnetic (EM) tracking system (NDI), such navigated endoscopes with a flexible shaft are particularly heavy, bulky, unwieldy and, above all, imprecise in terms of navigation. Therefore, these navigated endoscopes simply cannot be used for many procedures.

For example, US 2017/0238790 A1 discloses a navigated bronchoscope with a flexible shaft, at the distal end/end portion of which several trackers are provided, which can be detected by a corresponding tracking system.

SUMMARY

Therefore the objects and objectives of the present disclosure are to avoid or at least reduce the disadvantages of the prior art and, in particular, to provide a medical instrument, a surgical assistance system, an (image) representation method and a storage medium which provides surgical participants/medical personnel, in particular a (senior) surgeon, with a central intuitive and supportive fusion of information of an intracorporeal image of a targeted region and a representation of a navigation in 3D image data of the targeted region at a glance. In particular, a medical instrument is intended to enable precise navigation, be easy to use and inexpensive to manufacture. A further secondary object with regard to the instrument is to extend a possible field of view of an intracorporeal image. A further secondary object with regard to the surgical assistance system is to provide a correlated representation option in which the intracorporeal image in 3D image data can be displayed intuitively and in a complementary manner without the medical staff having to perform any additional mental work.

In principle, a medical instrument is provided that is adapted to target tissue by referencing an, in particular preoperative, 3D data set/3D image data, for example 3D image data from magnetic resonance imaging (MRI), and at the same time to provide a visual intracorporeal (picture) image/in-body picture during the operation. This medical instrument is referred to as an endoscopic navigation pointer (ENP) or endoscopic navigation pointer/endoscope navigation pointer. This endoscopic navigation pointer has at least one image sensor/capture sensor and a light source/lamp, which are preferably integrated into the distal end, in particular the distal tip. Furthermore, the instrument has a tracking element/tracking sensor (reference system) for localizing the position and/or alignment (orientation) of the tip in space. The endoscopic navigation pointer has a small but blunt distal tip for palpation of tissue during surgery, with the image sensor located near or in the region of the distal tip to create an intracorporeal image. The endoscopic navigation pointer furthermore has a handling portion, in particular a handle, with which the surgeon can grasp and hold the endoscopic navigation pointer manually, in particular without further support. The endoscopic navigation pointer has a rigid or determinable reference (i.e. at least one predetermined position; transformation matrix) between the distal tip, preferably the image sensor and the tracking sensor/reference system, so that the position and/or orientation of the distal tip and preferably the image sensor can be inferred in particular via the reference system and the static or rigid reference. The data of the image sensor and further preferably the data of the tracking sensor/reference system can be transmitted via a data interface to a computer/computer system/control unit, which can control a display for a visual output.

Using the medical instrument and transferring the data via the data interface to an (external) computer, the surgeon can simultaneously generate and view a visual image from inside the body (intracorporeal image) and a picture showing the current position of the endoscopic navigation pointer relative to 3D image data, in particular a preoperative 3D data set.

In other words, a medical instrument is provided with a tip at a distal end adapted to palpate or sample a tissue. The instrument comprises at least one capture sensor/image sensor and at least one light source, which are arranged, in particular integrated, in the medical instrument close to or in the region of the distal tip and preferably have a predetermined or determinable position and/or orientation relative to the distal tip. The instrument also has a handling portion, in particular a handle, to enable a user to hold the instrument. Furthermore, the instrument has a geometric reference system with an already known reference (in particular with regard to position and orientation) to the distal tip in order to enable a position and/or orientation of the distal tip to be determined in three-dimensional space. Finally, the instrument also has an interface to an (external) computer (with a screen for a display) or to an external control unit in order to display the image (intracorporeal image) of the capture sensor and in particular the position and/or orientation of the distal tip relative to 3D image data, in particular preoperative 3D image data.

The combination of the 'two devices' or two different technical modalities of navigation and visualization in only one instrument has the advantage that a procedure can be performed even better in only one step using only one instrument. The instrument according to the present disclosure accelerates a procedure and increases safety, as both modalities are available simultaneously and can be used in particular to identify tissue. The combination also accelerates a learning curve of a user in endoscopic surgery, in particular in neurosurgery, and also increases a time during the procedure in which an endoscopic picture is provided or can be used. The surgeon no longer has to switch back and forth between the two devices and both modalities of visualization and navigation can be provided continuously during the procedure.

In particular, the endoscopic navigated pointer allows precise palpation of tissue with its small but blunt tip. In particular, this new variant of the endoscopic navigation pointer can use chip-in-tip (CIT) technology, in which the imaging sensor is integrated directly into the distal end. In particular, this technology makes it possible to produce a lighter and less bulky instrument such as this one.

In still other words, according to the present disclosure, there is provided a medical, in particular surgical, instrument comprising: a proximal handling portion, in particular a handle; a distal end portion/end adapted to be inserted intracorporeally into a patient and having a distal tip adapted to palpate an intracorporeal tissue of a patient, in particular being blunt; and a shaft connecting the proximal handling portion to the distal end portion, preferably rigidly, wherein the handling portion has a geometric reference system with a predetermined pose relative to the distal tip, so that a position and/or orientation of the distal tip (in three-dimensional space) is (detectable and) determinable via the geometric reference system. An, in particular distal, portion of the shaft and/or of the distal end portion comprises at least one image capture unit/imaging device with a capture sensor for creating an intracorporeal image in a capture direction and a lamp/light source for illuminating the intracorporeal image (the lamp is adapted to provide light for illuminating the image of the image capture unit), wherein the image capture unit is adapted to provide the intracorporeal image in a computer-readable manner and preferably has a determinable capturing position and/or capturing orientation with respect to the reference system and/or with respect to the distal tip, and the medical instrument comprises an (data) port/data interface adapted to send computer-readable/digital data, in particular to send and receive data to provide at least the intracorporeal image, and preferably the predetermined pose of the geometric reference system with respect to the distal tip and/or with respect to the at least one image capture unit, to a control unit/a computer.

In the present disclosure, the term 'distal' defines a side or direction facing away from the user, such as a surgeon (toward the patient). In contrast, the term 'proximal' defines a side or direction facing towards the surgeon (away from the patient).

The term 'position' refers to a geometric position in three-dimensional space, which is specified in particular using coordinates of a Cartesian coordinate system. In particular, the position can be specified by the three coordinates X, Y and Z.

The term 'orientation' in turn indicates an alignment (for example at the position) in space. It can also be said that the orientation indicates an alignment with a direction or rotation in three-dimensional space. In particular, the orientation can be specified using three angles.

The term 'pose' includes both a position and an orientation. In particular, the pose can be specified using six coordinates, three position coordinates X, Y and Z and three angular coordinates for the orientation.

The term 'distal tip' describes the distal region of the instrument, which tapers so to speak from a basic shape at a distance perpendicular to the longitudinal axis, in particular decreases in diameter, and forms a distal end face for palpation of the tissue via the continuous tapering.

The term 'distal end portion' means a distal region/portion of the instrument which is in particular 25%, particularly preferably 10%, most preferably 5%, of the total length of the instrument (from the proximal end of the handling portion to the distal tip) along the longitudinal axis from the handling portion to the distal tip. The distal end portion may be an independent assembly of the instrument as well as a portion of the shaft itself.

Advantageous embodiments are explained in particular below.

According to a preferred embodiment, the at least one capture sensor of the image capture unit may be a CCD sensor and/or a CMOS sensor/chip. In particular, the capture sensor is integrated directly into the distal end portion, in particular into the distal tip (chip-in-tip technology). This has the advantage that the instrument can be built small and can be guided precisely and only needs to provide data transmission of the intracorporeal image.

According to a further preferred embodiment, the at least one lamp may be in the form of an LED, which is preferably integrated directly in the distal end portion of the medical instrument, in particular in the distal tip. In this way, the illumination can be provided directly at the location where it is required for the illumination of the image, without loss of light through a light guide, for example. An LED is energy-efficient, does not get warm and can be installed as a small component directly in the distal end and emit light parallel to a capture direction, for example. This means that the instrument only needs to provide a power supply for the illumination from the handling portion. In particular, the medical instrument can be adapted to set an illumination intensity via a control unit (automatically) and/or via a manual controller on the handling portion.

Preferably, at least two image capture units (each with a capture sensor and a lamp) may be provided, in particular integrated, in the distal end portion, in particular in the distal tip. Preferably, the two image capture units are arranged rotated with respect to a longitudinal axis of the distal end portion, in particular diametrically to each other, in order to create an intracorporeal image in two different capture directions from two different, in particular averted, sides of the distal end portion. In particular, one, two, three or more CCD or CMOS chips/sensors are integrated in the distal end portion, in particular in the distal tip, each of which has a different capture direction/viewing direction in order to expand a capturing region of the instrument.

In particular, one, two, three or more lamps, in particular in the form of an LED, are integrated in the distal end portion of the instrument, which provide sufficient illumination for the at least one capture sensor, in particular in the form of a CCD chip and/or a CMOS chip.

According to a further aspect of the disclosure, the image capture unit may be adapted to capture a 2D image and/or a 3D image and in particular comprise a 2D sensor and/or a 3D sensor as capture sensor. With a 2D (capturing) sensor, a two-dimensional intracorporeal image can be created, whereas with a 3D sensor, a spatial three-dimensional structure can also be captured and can be provided as an intracorporeal captured image. With the help of the 3D sensor, the instrument can provide a surgeon with even more information for an even better visual representation during a procedure. Preferably, this spatial information can also be used for navigation.

In particular, the at least one image capture unit, in particular the capturing sensor and/or the lamp, may be adapted to create a fluorescent intracorporeal captured image/fluorescence image as a functional image. Preferably, at least the lamp of the image capture unit can be configured to generate fluorescent light, in particular UV light. In addition, the capture sensor may be adapted to detect the emitted fluorescent light and in particular be sensitive to a predetermined frequency spectrum of electromagnetic radiation, in particular visible light or UV light, in order to provide the surgeon with a functional image. Preferably, a processing control unit that processes the intracorporeal image can be adapted to perform visual processing/optimized adjustment of the fluorescent image.

According to an aspect of the disclosure, the distal end portion, in particular the distal tip, may be adapted to be rotatable/pivotable about the longitudinal axis relative to the handling portion, in particular a proximal shaft portion, and the distal end portion may have the image capture unit. With such a configuration, a position of the end face of the distal tip remains constant, but a capture direction can be adjusted.

In particular, the instrument has a rigid/fixed longitudinal axis between the handling portion and the distal tip. In this way, the position of the distal tip relative to the handling portion is always the same and detectable via the reference system, but in particular a portion of the shaft can be rotated about its longitudinal axis. Preferably, the distal end portion can be rotated about its longitudinal axis. Further preferably, a partial portion of the shaft including the distal end portion can be rotated about the rigid longitudinal axis.

According to a further aspect of the disclosure, the shaft and/or the distal end portion may comprise a radially outer sheath/sheathing mounted rotatably about/relative to a longitudinal axis of the shaft and thus rotatable with respect to the handling portion, and the at least one image capture unit is integrated in the sheath such that the image capture unit is rotatable about the longitudinal axis in order to extend a detectable region of an intracorporeal image. In particular, the sheath has a handle surface at its proximal end for manual gripping and rotation. Preferably, this handle surface is a circumferential corrugated structure and/or circumferentially arranged troughs in the longitudinal direction and/or a protrusion in the radial direction.

According to an aspect of the disclosure, the instrument comprises (at least) a portion of the shaft which is rotatable relative to the handling portion about the longitudinal axis, in particular by 360°, and this portion comprises the image capture unit, which is in particular integrated so that the capture sensor of the image capture unit is rotatable about the longitudinal axis and extends a visual capturing region.

Preferably, the rotatable sheath may be configured in the form of a hollow cylinder/sleeve, with a preferably distal cap, which is rotatably mounted around a central support, in particular in the form of a shaft, preferably a hollow shaft. In particular, in the embodiment of the hollow shaft, cables of the image capture unit can be guided in it. In particular, the rotatable sheath can have a circumferential sliding contact to the shaft for transmitting the data, so that the sheath can be rotated about the longitudinal axis as desired without a stop and is constantly in contact with at least one data line in the shaft and can transmit the image data of the intracorporeal image. At this point it should be mentioned that if the sheath is configured with a distal cap, the distal tip of the cap, which also forms the distal tip to a certain extent, is rotatable about the longitudinal axis and thus an orientation of the distal (sheath) cap (about the longitudinal axis) changes, but a position of the distal tip itself always remains rigid/fixed/the same in relation to the handling portion and the reference system. Thus, regardless of the orientation of the distal cap, a tissue can still be palpated using the distal tip in order to ensure precise navigation. The instrument may be adapted to detect a rotation angle of the sheath and to provide it via the data interface (of a control unit) in order to determine a capturing position and a capturing orientation of the capturing sensor (via the reference system) via the pre-known/predetermined capturing position of the capturing sensor, via the rotation angle and preferably also via the distance of the capturing sensor to the longitudinal axis. In this way, it is possible to calculate exactly at which point in three-dimensional space, in particular in relation to 3D image data, and in which capture direction the intracorporeal capturing will be performed. In this case, a single rotation angle is sufficient, since this is the only parameter of the image capture unit or capturing sensor that can be freely changed.

In particular, the rotatable sheath may be configured as a circumferentially hermetically sealed sheath, which is configured to be fluid-tight, in particular in the radial direction.

In particular, the shaft has a rigid, S-shaped extension of its longitudinal axis, in which a first shaft portion runs parallel to a second shaft portion but offset to each other and which are connected to each other by an (S-shaped) curved portion. In particular, the shaft has a circular radial outer contour. Preferably, the shaft has a circular outer contour with the same diameter along its longitudinal axis, which only tapers at the distal tip.

According to a further aspect of the disclosure, a distance ('total length') between the proximal end of the handling portion and the distal tip may be less than 50 cm, more preferably less than 40 cm and most preferably less than 30 cm.

In particular, the shaft is rigidly/fixedly connected to the handling portion and preferably the distal end portion is fixed/rigidly connected to the handling portion and thus to the reference system, so that a position and also in particular an orientation of the distal tip relative to the reference system is always static and does not change (i.e. always has a predetermined reference).

The objects of the present disclosure are solved with respect to a surgical assistance system for use in a surgical procedure on a patient, in that the surgical assistance system comprises a medical instrument according to the present disclosure; at least one display device, in particular a surgical monitor, for representing a visual content; a geometric tracking system/sensor system adapted to determine a position and/or orientation of the distal tip and/or the image capture unit via detection of the position and/or orientation of the reference system of the medical instrument; a data provision unit, in particular a storage unit, which is adapted to provide digital 3D image data, in particular preoperative 3D image data, of the patient, and a control unit which is adapted to process the intracorporeal captured image and the 3D image data provided via the data interface and to generate a combined representation, in particular a correlation representation, of the intracorporeal captured image and the 3D image data, in particular a correlation representation, with both at least one representation of the intracorporeal image and a representation of a view of the 3D image data, in which the position and/or orientation of the distal tip is preferably contained/represented, and visually output by the display device. With the aid of the surgical assistance system, it is therefore possible to use a single instrument to display both an intracorporeal image in the combined representation and to perform 'virtual' navigation in the patient's 3D image data via the display device. The reference system is part or a supplementary part of the tracking system.

According to one embodiment, the reference system may comprise, in particular, a rigid device with, preferably, at least three spaced apart, in particular spherical, infrared reflector markers and the geometric tracking system may comprise a 3D camera system with at least one 3D camera or a stereo camera, which is adapted to detect/track the infrared reflector markers, and to determine (via the predetermined or determinable pose from reference system to distal tip) the position and/or orientation of the distal tip. In particular, a position and orientation of the reference system can be provided to the control unit, as part of the tracking system, and the control unit can calculate or determine a position and/or orientation of the distal tip via the predetermined pose from the reference system to the distal tip. In particular, the predetermined pose from the reference system to the distal tip and/or image capture unit is available in the form of a transformation matrix, so that the control unit can infer the position and/or orientation of the distal tip and/or image capture unit by means of a simple mathematical calculation. In particular, the geometric tracking system has a rigid body with infrared reflector markers that are captured by a 3D camera system, so that a pose of the reference system relative to the 3D camera system is detectable.

According to a further aspect of the disclosure, the reference system may comprise a rigid body/device with defined optical patterns, in particular QR markers, and furthermore the tracking system may comprise a camera system with at least one camera adapted to detect the rigid bodies with optical patterns. In particular, the reference system may therefore have optically detectable rigid body patterns, such as QR markers/trackers, which are detected by a camera system of the tracking system, so that in particular a relative pose with respect to the external camera system is determined by the control unit as part of the tracking system.

According to one embodiment, the reference system may comprise electromagnetic sensors (EM sensors), and the tracking system may comprise an electromagnetic sensor system. In particular, the electromagnetic sensors of the reference system may be adapted to detect an electromagnetic field generated by the sensor system/tracking system and to determine a pose relative to the sensor system via this field. Alternatively, the electromagnetic sensors of the reference system may also generate two perpendicular electromagnetic fields that can be detected by a correspondingly adapted electromagnetic sensor system/tracking system in order to determine a pose in three-dimensional space relative to the sensor system. In particular, the geometric reference system may therefore have electromagnetic sensors that are tracked via an electromagnetic sensor system.

According to a further aspect of the disclosure, the tracking system may further comprise at least one camera, in particular a camera of a surgical microscope, in order to capture the medical instrument, in particular the handling portion. The medical instrument, in particular the handling portion, has a predetermined geometry as a reference system, which is stored in a storage unit, so that the tracking system, in particular the control unit, can determine the position and/or orientation of the distal tip on the basis of the predetermined geometry and the predetermined pose, in particular using machine vision. The instrument can thus be tracked by a camera of the tracking system without additional markers/trackers, since only the pre-known geometry of the instrument, in particular of the handle, stored in a storage unit is sufficient to detect and determine the pose of the instrument in space (relative to the camera) using methods such as machine vision.

The medical instrument may further comprise an electrode which is adapted to perform nerve monitoring. The control unit may be adapted to achieve or perform a correlation of the intracorporeal image and the 3D image data on the basis of the nerve monitoring. In particular, the instrument therefore has a distal electrode that provides the control unit with signals relating to nerve activity (voltage pulses) in order to correlate the intracorporeal image and the 3D image data via these signals with a corresponding nerve path in the 3D image data.

In particular, the 3D image data may comprise MRI image data and/or CT image data and/or 3D ultrasound data. This 3D image data can be used to perform precise navigation, in particular for minimally invasive procedures.

Preferably, the control unit may be adapted to create a combined representation in the form of a side-by-side representation of intracorporeal image and 3D image data, or to create a correlation representation in the form of a superimposed representation of the intracorporeal image and the correlated 3D image data. In particular, a computer-aided augmented reality method can be used for the correlation display. The control unit and the display device thus show the intracorporeal image and the view of the 3D image data side by side or correlated and superimposed in the generated and output combined representation. In the correlated representation in particular, the intracorporeal image can be displayed position-correctly, in particular in the correct position, i.e. at the actual position or pose in relation to the virtual 3D image data, or superimposed partially transparently (augmented reality).

According to a further aspect of the disclosure, the control unit may be adapted to fade in optical parameters, in particular a focus axis and/or a working volume and/or a field of view of the at least one image capture unit, in particular of the capture sensor, into the 3D image data in the combined representation. The control unit thus generates such a combined representation in which the optical parameters are also displayed so that the surgeon can visually see all parameters relevant to the procedure on just a single display device. This provides even better support for a navigated procedure.

Preferably, the data interface may be wired or wireless, and may in particular have a wireless interface such as WLAN and/or Bluetooth. With the wireless interface, the instrument can be configured to be mobile and even handier, as there is no need for a cable to a base station. In this case, the instrument has an internal energy source, in particular in the form of a rechargeable battery, so that it can operate autonomously.

With regard to an image representation method for visualizing a combined representation, in particular a correlation representation, in particular in a surgical assistance system of the present disclosure, the objects and objectives of the present disclosure are solved in that the method comprises the steps of: creating an intracorporeal image by the image capture unit of the medical instrument; detecting a pose of the reference system by the tracking system; calculating, by the control unit, a position and/or orientation of the distal tip and/or of the image capture unit via the detected pose of the reference system and the predetermined pose of the distal tip or of the image capture unit with respect to the reference system; generating a combined representation, in particular a correlation representation, by the control unit with both at least one representation of the intracorporeal image and a representation of a view of the 3D image data; preferably adding, in particular superimposing, the position and/or orientation of the distal tip in the view of the 3D image data of the combined representation; outputting the combined representation by the display device. The method provides a surgeon with all relevant information regarding the procedure at one glance. Preferably, the surgeon has a permanent representation of the intracorporeal image and the navigation of the 3D image data available at the same time. In particular, the position and/or orientation of the distal tip relative to 3D image data/a 3D data set can be recorded and displayed via the display device (in the combined representation).

With respect to a computer-readable storage medium, the objects and objectives of the present disclosure are solved in that the computer-readable storage medium comprises instructions which, when executed by a computer, cause the computer to perform the method steps of the image representation method according to the present disclosure.

The features of the medical instrument of the present disclosure and the surgical assistance system of the present disclosure may be used interchangeably.

BRIEF DESCRIPTION OF THE DRAWINGS

The present disclosure is explained below with reference to preferred embodiments with the aid of accompanying Figures.

The Figures are merely schematic in nature and are intended only to aid understanding of the disclosure. Identical elements are provided with the same reference signs. The features of the various embodiments can be interchanged.

DETAILED DESCRIPTION

Figure 1:
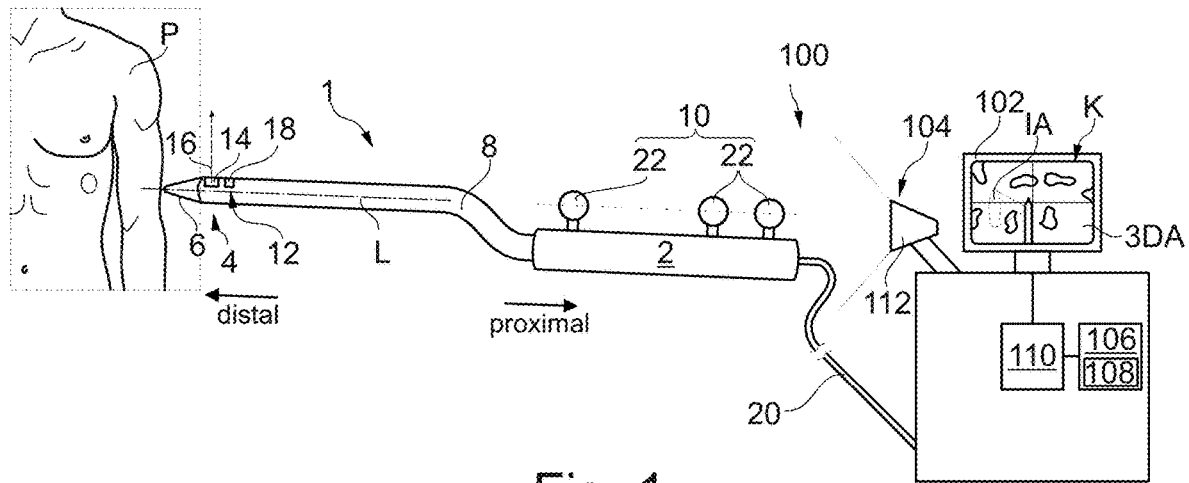
FIG. 1 shows a schematic top view of a surgical assistance system of a preferred embodiment with a medical instrument in the form of an endoscopic navigation pointer according to a first embodiment, in which infrared trackers are arranged on the handling portion.

FIG. 1 shows a schematic view of a surgical assistance system 100 of a preferred embodiment with a medical instrument according to a first preferred embodiment, which is configured as an endoscopic navigation indicator/endoscopic navigation pointer/endoscope navigation pointer 1.

The endoscopic navigation pointer 1 has a proximal handling portion in the form of a handle 2, which is adapted to be gripped and guided manually by medical personnel such as a surgeon. Alternatively, the handling portion may also be adapted to be guided by a robotic arm.

A distal end portion 4 of the endoscopic navigation pointer 1 is adapted to be inserted intracorporeally into a patient P and has a blunt distal tip 6 which is adapted to precisely and selectively palpate an intracorporeal tissue of the patient P without irreversibly damaging the tissue. A shaft 8 rigidly/fixedly connects the distal end portion 4 and the handle 2 and has a substantially cylindrical and closed outer contour along a longitudinal axis L, which is S shaped. In this embodiment, the distal end portion 4 is a distal partial portion of the shaft 8.

Since the handle 2 has a geometric reference system 10 and the distal tip 6 has a rigid geometric relation to the reference system 10, the pose of the distal tip 6 is determinable via a determination of the pose (i.e. position and orientation) of the handle 2. It can also be said that a transformation matrix between the distal tip 6 and the reference system 10 is predetermined and static, so that a corresponding determination of the pose of the distal tip 6 in three-dimensional space is determinable via the detectable reference system 10.

This design with distal tip 6, shaft 8 and handle 2 with reference system 10 corresponds substantially to a design of a navigation indicator/navigation pointer which is used to aim at a specific point in three-dimensional space via the distal tip 6 and to detect it geometrically in three-dimensional space with respect to 3D image data. In contrast to the known prior art, however, this embodiment of the endoscopic navigation pointer 1 also has an image capture unit/imaging device 12 with a (picture) capture sensor 14 in the form of a CCD chip (CCD—charge coupled device, i.e. a light-sensitive electronic component) on its distal end portion 4 or (since in the present case the distal end portion is part of the shaft 8) on a distal portion of the shaft 8 for creating an intracorporeal (picture) image in a capture direction 16. Since the small capture sensor 14 is integrated directly in the distal end portion 4, the size of the endoscopic navigation pointer 1 can be kept small or compact.

In order to illuminate the intracorporeal image IA or to provide light for illuminating the image of the image capture unit 12, a lamp 18 in the form of an LED is also provided in the distal end portion 4. In other words, the image capture unit 12 is integrated in the distal end portion 4 and has a capture sensor 14 for capturing the image and an LED for illumination. The capturing sensor 14 and the LED are arranged and aligned on the distal portion of the shaft 8 or distal end portion 4 in such a way that the capture direction 16 is substantially parallel to an illumination direction of the lamp 18.

Since the handle 2 is rigidly/immovably connected to the distal end portion 4 via the shaft 8, the reference system 10 is also rigidly attached to the handle 2 and a predetermined, static pose (position and orientation; transformation matrix) of the image capture unit 12 relative to the reference system 10 is known, the pose of the image capture unit 12, in particular the capturing sensor 14 with corresponding capture direction 16 and thus the intracorporeal image IA, can also be inferred from the captured pose of the reference system 10. The image capture unit 12 also has a predetermined pose (transformation matrix) relative to the distal tip 6, so that the pose of the tip 6 can be used to infer the pose of the image capture unit 12 and vice versa. The image capture unit 12 thus has a determinable, here predetermined, capturing position and capturing orientation with respect to the reference system 10 and with respect to the distal tip 6. Thus, the poses between the reference system 10, (the handle 2), the distal tip 6 and the image capture unit 12 are all predetermined and known. In this embodiment, the reference system 10 has three spaced infrared reflector markers 22.

Furthermore, the image capture unit 12 is adapted to provide the intracorporeal image in computer-readable or digital form and the endoscopic navigation pointer 1 has a data interface 20, in this embodiment a data cable, which sends computer-readable/digital data to a control unit 110 of the surgical assistance system 100 in order to provide the intracorporeal image to the control unit 110 in computer-readable form. In addition, the control unit 110 also receives data from the control unit, for example to set an illumination intensity of the lamp 18. The surgical assistance system 100 furthermore has at least one display device in the form of a surgical monitor 102 for representation.

A (geometric) tracking system 104 of the surgical assistance system with a 3D camera 112 and an infrared emitter 114 detects the three infrared reflector markers 22 in three-dimensional space and thus the pose of the reference system 10. By detecting the pose of the reference system 10 and a relation/reference stored in a storage unit 108 from the reference system 10 to the distal tip 6 and to the capture sensor 14 with corresponding capture direction 16, the tracking system 104 can infer the actual current pose of the distal tip 6 and of the capturing sensor 14. Specifically, in this embodiment, the control unit 110 is adapted to perform a corresponding determination or calculation and thus act as part of the tracking system 104.

Digital preoperative 3D image data 3DA of the patient P is stored in a data provision unit, here the storage unit 108. These were recorded before the procedure, for example using magnetic resonance imaging (MRI) or computed tomography (CT).

The control unit 110 is specially adapted to process the intracorporeal captured image IA provided via the data interface 20 and the 3D image data 3DA and to generate a combined representation, in particular a correlation representation, with a representation of the intracorporeal image IA and a representation of a view of the 3D image data 3DA and to output it visually via the surgical monitor 102. In addition, the position and orientation of the distal tip 6 is displayed in the view of the 3D image data 3DA, so that all information is available to the surgeon at one glance. The real pose of the distal tip 6 is thus transferred to the virtual space of the 3D image data and is displayed there.

Furthermore, the intracorporeal image IA is also displayed in the correct position in the view of the 3D image data 3DA (correlated), so that the surgeon has access to information from both image data at one glance and can perform a corresponding procedure on patient P even more easily, safely and without fatigue.

Figure 2:
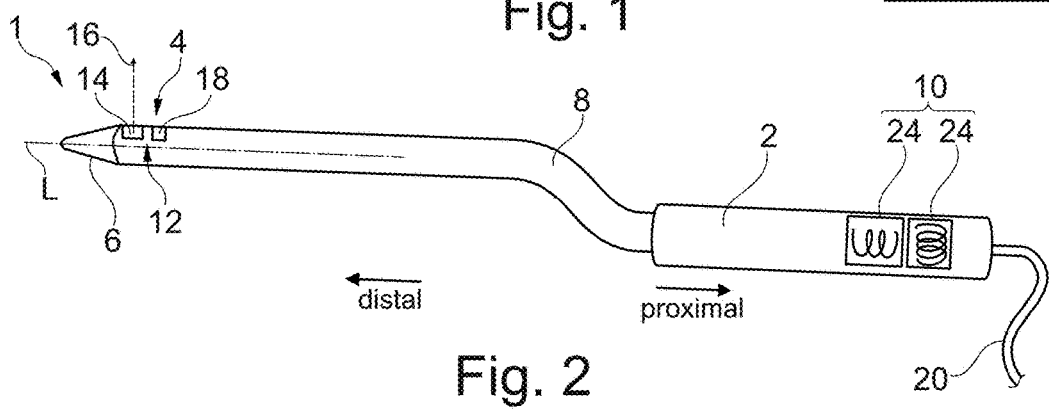
FIG. 2 shows a schematic top view of a medical instrument according to a further preferred embodiment, in which the handling portion has EM sensors.

While FIG. 1 shows an endoscopic navigation pointer 1 with a fixed/rigid shaft 8 and with infrared reflector markers 22 (infrared trackers), FIG. 2 shows a further, second preferred embodiment of the endoscopic navigation pointer 1 with an electromagnetic tracker/sensor as reference system 10. The endoscopic navigation pointer 1 of the second embodiment differs from that of FIG. 1 only in the differently configured tracking system 104 with an electromagnetic sensor/EM sensor 24.

Specifically, an EM sensor 24 in the form of two perpendicular coils is provided in the handle 2 in order to determine a pose of the reference system 10. Instead of the camera and the infrared light, the tracking system 104 has a corresponding device for generating an electromagnetic field. The signal from the EM sensors 24 is provided to the control unit 110 via the data interface 20 so that it can then determine the (relative) pose of the reference system 10 and thus of the distal tip 6 and of the capture sensor 14.

Figure 3:
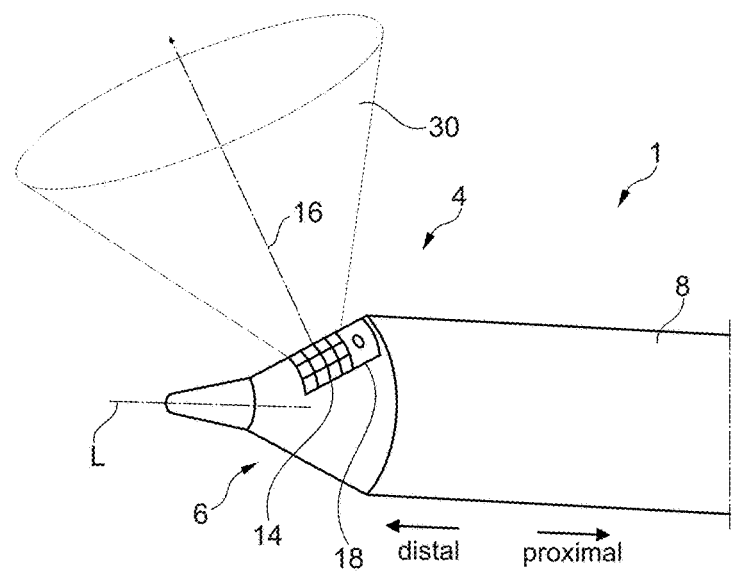
FIG. 3 shows a detailed partial view of a distal shaft portion with distal end portion of a medical instrument of further preferred embodiment, in which the image capture unit is integrated in the distal tip.

FIG. 3 shows a perspective partial view of a medical instrument in the form of an endoscopic navigation pointer 1 according to a further, third preferred embodiment. In contrast to the preceding embodiments, the image capture unit 12 is integrated directly in the distal tip 6, i.e. where the diameter of the shaft 8 is reduced. Specifically, the distal tip 6 has two tip portions 26, 28, a first conical or frustoconical tip portion 26, which is directly bordering on the shaft portion with a constant diameter and in which the image capture unit 12 is integrated in its radial outer side, and a second tip portion 28, which is directly adjacent to the first tip portion 26, is more pointed than the first tip portion 26 and forms a frustoconical spike.

The image capture unit 12 has a capture direction 16 which is inclined by 60° to the distal front relative to the longitudinal axis of the shaft 8, so that the intracorporeal image IA comprises both a region to the distal front and to the radial side and an endoscopic viewing direction is extended to a certain extent. On the outside of the first frustoconical tip portion, the LED is integrated along the circumference, in particular around a circumferential section of approximately 50° around the longitudinal axis L, and the CCD capture sensor 14 is directly connected to it distally, also along the circumference, also around the longitudinal axis L by approximately 50°. Both the capturing sensor 14 and the LED are separated from the surroundings by a transparent protective layer, so that the instrument 1 is insensitive to dirt and easy to clean. A sight cone 30 of the capture sensor 14 along the capture direction 16 is shown schematically in FIG. 30. In particular, the control unit 110 can be adapted to back-calculate a corrected intracorporeal image from the distorted intracorporeal image IA (extreme wide angle; no planar sensor) and display it in the combined representation in a correspondingly corrected form.

Figure 4:
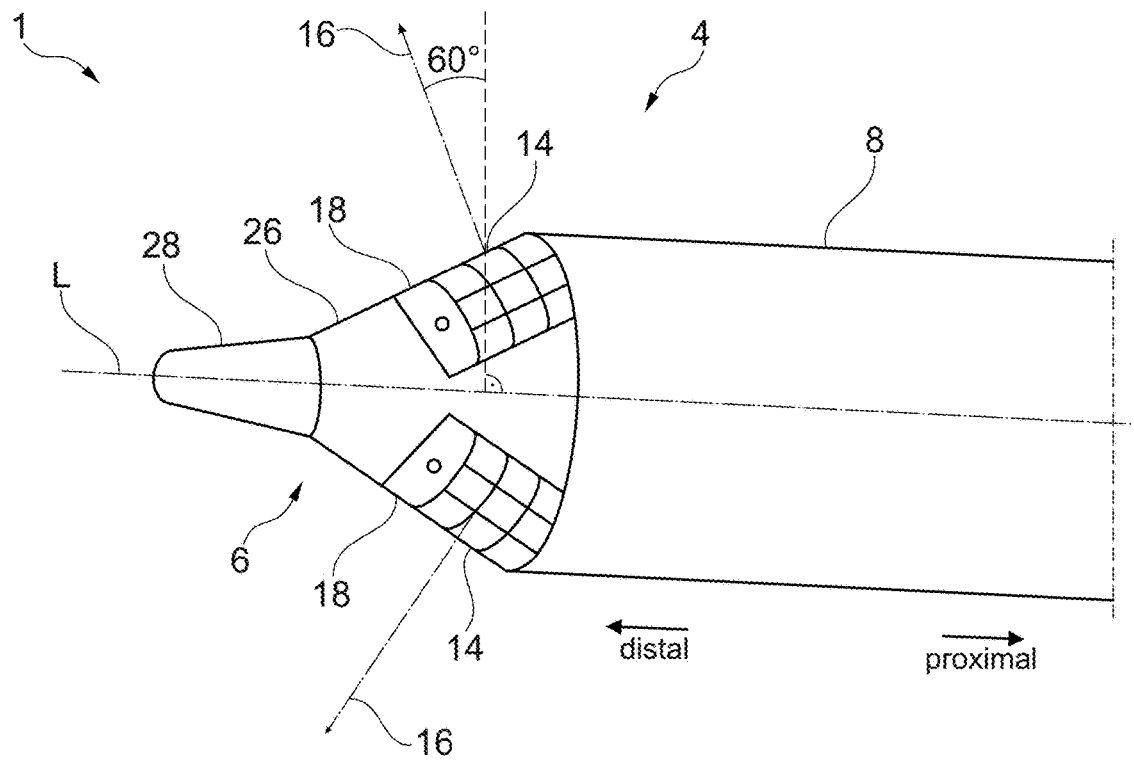
FIG. 4 shows a detailed partial view of a distal end portion of an instrument of further preferred embodiment in which a plurality of image capture units are integrated.

FIG. 4 shows a further preferred embodiment in which, in contrast to the third embodiment of the instrument 1, not only one image capture unit 12 but two image capture units 12 are integrated in the distal tip, each with a capturing sensor 14 and an illumination means 18 in the form of an LED. The capture directions are rotated around the longitudinal axis L relative to each other or turned away from each other relative to the longitudinal axis L, so that an endoscopic field of view is expanded in two opposite directions, so to speak. The capture directions 16 are different. The capture sensor 14 of one image capture unit 12 is located diametrically opposite or facing away from the other capture sensor 14. Similarly, the arrangement of LED and capture sensor 14 is reversed along the longitudinal axis L, so that in this embodiment the two LEDs are arranged distally (at a level of the longitudinal axis L) and the two CCD capture sensors 14 are arranged proximally opposite the LEDs. In this way, the two LEDs shine even better in the distal direction for illumination of the intracorporeal tissue.

Figure 5:
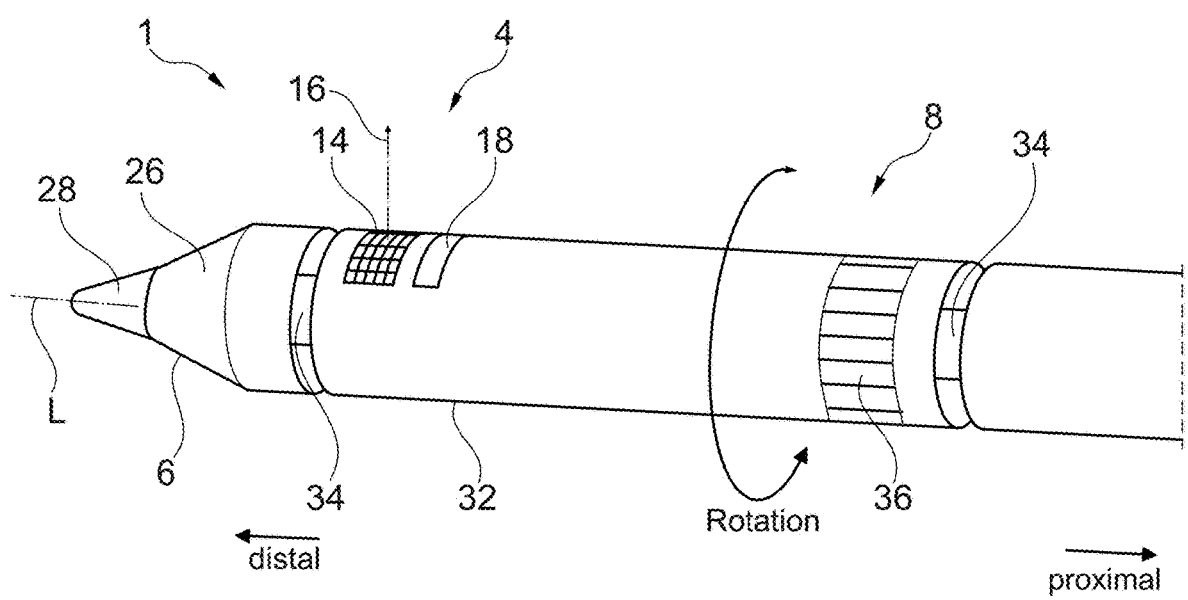
FIG. 5 shows a perspective partial view of a medical instrument of a further preferred embodiment, in which a capturing sensor and an illumination means are provided in a rotatable sheath of the shaft.

FIG. 5 shows a further, fifth particular embodiment of the endoscopic navigation pointer 1 with a rotatable sheath/sheathing 32 of the shaft 8. The distal end portion 4 is further rigidly fixed/connected to the handle 2 via the shaft 8, wherein a distal partial portion of the shaft 8 comprises the radially outer sheath 32, which is rotatably mounted about the longitudinal axis L and has a proximal geometrically structured handle surface to be manually grasped and rotated. The handle surface 36 on the rotatable sheath 32 allows easy rotation by hand from the proximal end, while the distal tip 6 is rigidly fixed relative to the handle 2.

The image capture unit 12 is integrated in the sheath and a capture direction 16 is perpendicular to the longitudinal axis L and points radially outwards. With this design, the image capture unit 12 is rotatable around the longitudinal axis L and a detectable region of the intracorporeal image IA is extended extensively. The surgeon can simply rotate the image capture unit 12 to the position where he wants to create an image.

The sheath 32 is closed in the radial direction/circumferentially and is configured to be hermetically fluid-tight. In this embodiment, the sheath 32 is configured as a hollow cylinder/sleeve, which is rotatably mounted around a central support of the shaft 8 in the form of a cylindrical shaft 34.

Figure 6:
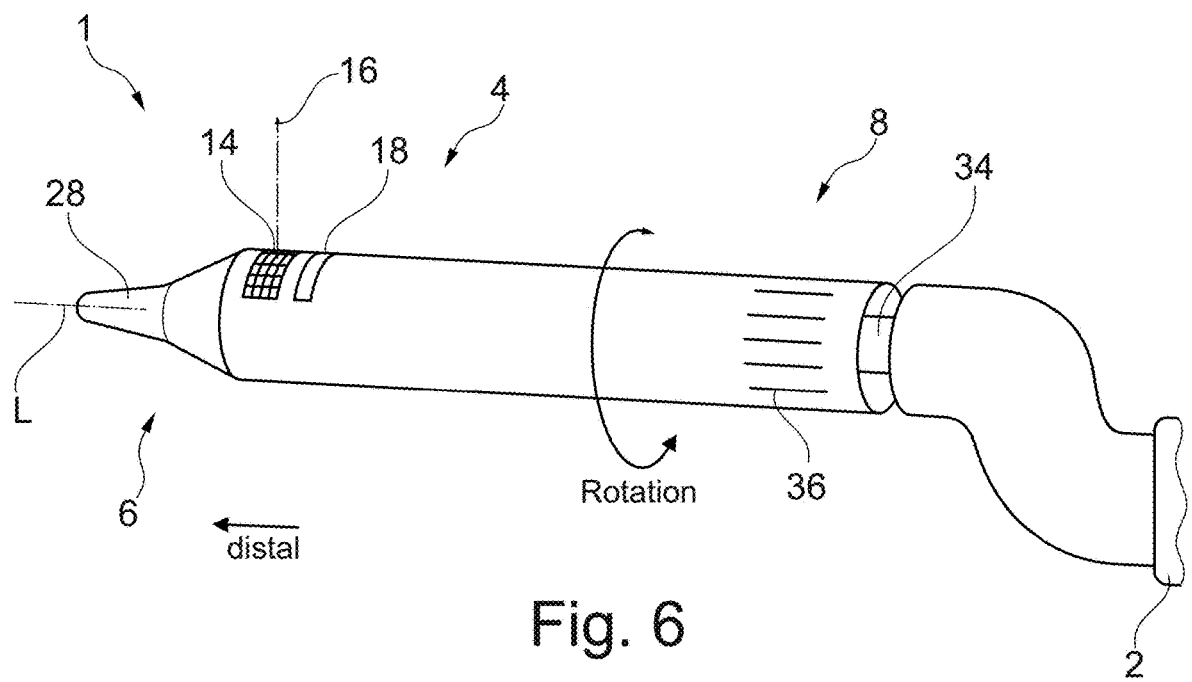
FIG. 6 shows a perspective partial view of a medical instrument of a further preferred embodiment in which a distal portion is rotatable.

FIG. 6 shows an endoscopic navigation pointer 1 of a further, sixth preferred embodiment, which, in contrast to the fifth embodiment of FIG. 5, the sheath 32 does not end at the distal tip 6, but includes the distal tip and thus forms a cap. When the sheath with cap is rotated, a radially outer sheath of the distal tip 6 also rotates.

Alternatively, the entire distal portion of the shaft 8 and of the distal end portion 4 can also be configured as a coherent assembly or unit, which is rotatably mounted on a proximal portion of the shaft 8. However, even when rotated about the longitudinal axis L, the position of the distal tip 6 remains fixed relative to the handle 2.

Figure 7:
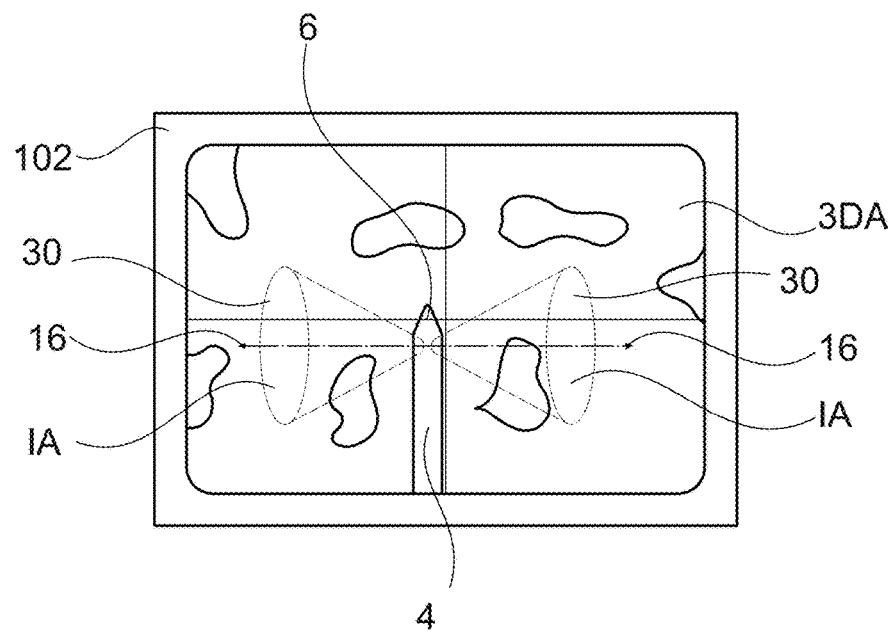
FIG. 7 shows a schematic view of a representation of the display device of the surgical assistance system.

FIG. 7 shows an exemplary representation of the surgical monitor 102 with a combined representation in the form of a correlation display of (two) intracorporeal images IA via two image capture units 12 of the instrument 1, which are displayed integrated in a view of the 3D image data 3DA of the patient P. Both the virtual distal tip 6 and the two intracorporeal images IA are superimposed in the 3D image data 3DA in the correct pose. In the surgical assistance system 100, a visual volume of the capture sensors 14 relative to the distal tip 6 is displayed in a superimposition with the 3D image data.

What is claimed:
1. A medical instrument comprising:
a proximal handling portion;
a distal end portion adapted to be inserted intracorporeally into a patient and having a distal tip; and
a shaft connecting the proximal handling portion to the distal end portion,
the proximal handling portion comprising a geometric reference system which has a predetermined pose relative to the distal tip, so that a position and/or orientation of the distal tip is determinable via the geometric reference system,
a portion of the shaft and/or the distal end portion comprising at least one image capture unit with a capture sensor integrated in a radial outer side of said portion of the shaft and/or of said distal end portion for creating an intracorporeal image in a capture direction and a lamp for illuminating the intracorporeal image,
the at least one image capture unit being adapted to provide the intracorporeal image in a computer-readable manner,
the at least one image capture unit comprising a determinable capturing position and/or capturing orientation with respect to the geometric reference system and/or with respect to the distal tip,
the medical instrument comprising a data interface adapted to send data to provide at least the intracorporeal image, and further the predetermined pose of the distal tip and/or the determinable capturing position and/or capturing orientation of the at least one image capture unit with respect to the geometric reference system,
the shaft defining a fixed longitudinal axis,
the at least one image capture unit having a capture direction extending transversely to the fixed longitudinal axis, and
the distal tip comprising a rounded tip adapted to palpate an intracorporeal tissue without tissue damage.

2. The medical instrument according to claim 1, wherein the capture sensor of the at least one image capture unit is a CCD sensor and/or a CMOS sensor.

3. The medical instrument according to claim 1, wherein the lamp is an LED that is integrated in the distal end portion.

4. The medical instrument according to claim 1, wherein the at least one image capture unit comprises two image capture units that are integrated in the distal tip and are arranged at an angle to each other with respect to the fixed longitudinal axis to create the intracorporeal image in two different capture directions from two different radial outer surfaces of the distal end portion.

5. The medical instrument according to claim 4, wherein the angle is 180 degrees such that two image capture units are arranged diametrically opposite to one another and aligned in opposite recording directions.

6. The medical instrument according to claim 1, wherein the at least one image capture unit is adapted to create a 2D image and/or a 3D image and comprises a 2D sensor and/or a 3D sensor as the capture sensor.

7. The medical instrument according to claim 1, wherein the at least one image capture unit is adapted to create a fluorescent intracorporeal image.

8. The medical instrument according to claim 1, wherein the shaft and/or the distal end portion has a radially outer sheath mounted rotatably about a longitudinal axis of the shaft and the at least one image capture unit is integrated in the radially outer sheath, such that the at least one image capture unit is rotatable about the longitudinal axis in order to extend a detectable region for the intracorporeal image.

9. The medical instrument according to claim 8, wherein the radially outer sheath comprises a hollow cylinder which is rotatably mounted around a shaft.

10. A surgical assistance system for use in a surgical procedure on a patient comprising:
the medical instrument according to claim 1;
at least one display device for representing a visual content;
a geometric tracking system adapted to determine a position and/or orientation of the distal tip and/or the at least one image capture unit via detection of the position and orientation of the geometric reference system of the proximal handling portion of the medical instrument;
a data provision unit adapted to provide 3D image data; and
a control unit adapted to process the intracorporeal image and the 3D image data provided via the data interface and to generate a combined representation with both at least one representation of the intracorporeal image and a representation of a view of the 3D image data, and visually output by the at least one display device.

11. The surgical assistance system according to claim 10, wherein the geometric reference system comprises at least three infrared reflector markers spaced apart from each other, and
wherein the geometric tracking system comprises a 3D camera system with at least one 3D camera or stereo camera adapted to spatially detect the at least three infrared reflector markers to determine the position and/or orientation of the distal tip.

12. The surgical assistance system according to claim 10, wherein the geometric reference system comprises a rigid body with optical patterns and the geometric tracking system comprises a camera system with at least one camera adapted to detect the rigid body with optical patterns.

13. The surgical assistance system according to claim 10, wherein the geometric reference system comprises electromagnetic sensors, and the geometric tracking system comprises an electromagnetic sensor system for spatially detecting the electromagnetic sensors relative to the electromagnetic sensor system.

14. The surgical assistance system according to claim 10, wherein the geometric tracking system further comprises at least one camera in order to capture the proximal handling portion, and the proximal handling portion has a predetermined geometry as the geometric reference system, which is stored in a storage unit, and the geometric tracking system determines the position and/or orientation of the distal tip based on the predetermined geometry.

15. The surgical assistance system according to claim 9, wherein the distal tip of the medical instrument further comprises an electrode which is adapted to perform nerve monitoring, and the control unit is adapted to perform a correlation of the intracorporeal image and the 3D image data based on said nerve monitoring.

16. The surgical assistance system according to claim 10, wherein the 3D image data comprises MRI image data, CT image data and/or 3D ultrasound data.

17. The surgical assistance system according to claim 10, wherein the control unit is adapted to create:
a side-by-side representation of the intracorporeal image and a view of the 3D image data, or
a superimposed representation of the intracorporeal image and the correlated 3D image data.

18. The surgical assistance system according to claim 10, wherein the control unit is adapted to fade in optical parameters of a focus axis and/or a working volume and/or a field of view of the at least one image capture unit into the 3D image data in the combined representation.

19. An image representation method for visualizing the combined representation in the surgical assistance system according to claim 9, comprising the steps of:
creating the intracorporeal image by the at least one image capture unit of the medical instrument;
detecting a pose of the geometric reference system by the geometric tracking system;
calculating, by the control unit, a position and/or orientation of the distal tip and/or of the at least one image capture unit via the pose of the geometric reference system and the predetermined pose of the distal tip and/or of the at least one image capture unit with respect to the geometric reference system;
generating the combined representation by the control unit with both at least one representation of the intracorporeal image and a representation of a view of the 3D image data;
outputting the combined representation by the at least one display device.

20. A computer-readable storage medium comprising instructions which, when executed by a computer, cause the computer to perform the method steps of the image representation method of claim 18.

21. The medical instrument according to claim 1, wherein the medical instrument has a rigid longitudinal axis between the proximal handling portion and the distal tip.

22. The medical instrument according to claim 1, wherein the fixed longitudinal axis of the shaft is S-shaped.

23. The medical instrument according to claim 1, wherein the lamp is configured to generate fluorescent light.

* * * * *